(12) United States Patent
Aravindakshan

(10) Patent No.: US 10,003,856 B2
(45) Date of Patent: Jun. 19, 2018

(54) METHOD AND SYSTEM OF CARRYING CONTENT FROM A CONTENT SERVER TO A PLURALITY OF ENODEB'S OVER AN LTE NETWORK

(71) Applicant: TEJAS NETWORKS LIMITED, Bangalore, Karnataka (IN)

(72) Inventor: Jishnu Aravindakshan, Karnataka (IN)

(73) Assignee: TEJAS NETWORKS LIMITED, Bangalore (IN)

(*) Notice: Subject to any disclaimer, the term of this patent is extended or adjusted under 35 U.S.C. 154(b) by 146 days.

(21) Appl. No.: 13/853,670

(22) Filed: Mar. 29, 2013

(65) Prior Publication Data

US 2013/0263190 A1    Oct. 3, 2013

(30) Foreign Application Priority Data

Mar. 29, 2012 (IN) .......................... 1231/CHE/2012

(51) Int. Cl.
*H04N 21/61* (2011.01)
*H04L 12/18* (2006.01)

(52) U.S. Cl.
CPC ..... *H04N 21/6181* (2013.01); *H04L 12/1886* (2013.01); *H04L 12/189* (2013.01); *H04N 21/6131* (2013.01)

(58) Field of Classification Search
CPC ............ H04N 21/6181; H04N 21/6131; H04L 12/1886; H04L 12/189
USPC .......................... 370/328, 329, 350, 395.32
See application file for complete search history.

(56) References Cited

U.S. PATENT DOCUMENTS

| | | | |
|---|---|---|---|
| 2010/0029320 A1* | 2/2010 | Malladi et al. ............... | 455/522 |
| 2010/0056166 A1* | 3/2010 | Tenny ............... | 455/450 |
| 2010/0246452 A1* | 9/2010 | Rajan ............... | 370/277 |
| 2010/0250647 A1* | 9/2010 | Rajan ............... | 709/203 |
| 2012/0002584 A1* | 1/2012 | Shimizu ............... | 370/312 |
| 2012/0083284 A1* | 4/2012 | Harrison et al. ............... | 455/450 |

* cited by examiner

*Primary Examiner* — Brian D Nguyen
(74) *Attorney, Agent, or Firm* — Oliff PLC

(57) ABSTRACT

The present invention relates to a method and system of carrying multicast/broadcast content from a content server to a plurality of enodeB's over an LTE network. In one embodiment this is accomplished by dividing the network into multiple MB SFN (Single Frequency Network), broadcasting a content distribution message to all the enodeBs within MBSFN by the content server, wherein the content distribution message having a content identification tag in order to inform all the enodeBs the appropriate time period or the non-busy period to download the content segments and downloading the content segments by all the enodeB's from the content server.

12 Claims, 3 Drawing Sheets

METHOD AND SYSTEM OF CARRYING CONTENT FROM A CONTENT SERVER TO A PLURALITY OF ENODEB'S OVER AN LTE NETWORK

This application claims benefit of Serial No. 1231/CHE/2012, filed 29 Mar. 2012 in India and which application is incorporated herein by reference. To the extent appropriate, a claim of priority is made to the above disclosed application.

FIELD OF THE INVENTION

The present invention is related to a wireless communication system. More particularly, the present invention is related to a method and system of carrying movie over LTE.

BACKGROUND OF THE INVENTION

The third generation partnership project (3GPP) Release 6 defines MBMS, which is a counterpart of other multicast services operating in other communication standards, such as digital video broadcast-handheld (DVB-H). MBMS allows downlink data to be transmitted from a single source to multiple recipients in broadcast or multicast modes. The existing 3GPP release has further enhanced it to define the MBMS channels, scheduling, bearers, procedures, and the like.

LTE defined in 3GPP release 8 and later, allows for the support of single cell and multi-cell MBMS transmissions. For multi-cell transmission, MBMS, (e.g., mobile TV), is transmitted on the coverage of a group of cells, MBMS may be transmitted on a multicast channel (MCH), soft combining of MBMS data at the receiver may be supported within a particular service group (i.e., single frequency network (SFN)), and synchronous transmission of MBMS data from multiple cells is possible. To achieve synchronous data transmission in multiple cells in the LTE architecture, inter-cell scheduling is required. In Release 6, the synchronization is performed by a radio network controller (RNC). Further, in Release 9, MBMS support dividing the network into Multiple MB SFN (Single Frequency Network) each of which may have multiple enodeBs which are time synchronized with each other.

The limitation of the present release is that it specifies how to multicast/broadcast a service but does not explain how one could use this enhancement to provide MBMS premiered on a particular day and a particular time like for example a movie need to be premiered. Further, as the premiered time may be a peak network usage time, we would need mechanism for efficient transfer of the content through usage of backhaul resources during non-peak time when there is very less congestion in the network. Furthermore, if the content is kept remotely to optimize the backhaul usage, the content has to be protected from piracy before it is premiered.

Thus there is a need for an improved and secure method and system for efficiently carrying multicast and broadcast content over LTE which overcomes the above mentioned limitations.

SUMMARY OF THE INVENTION

An aspect of the present invention is to address at least the above-mentioned problems and/or disadvantages and to provide at least the advantages described below.

Accordingly, an aspect of the present invention is to provide a method of carrying content from a content server to a plurality of enodeB's over an LTE network, the method comprising: dividing the network into multiple MB SFN (Single Frequency Network), wherein each of which includes multiple eNodeBs, wherein the eNodeBs are time synchronized with each other, broadcasting a content to all the enodeBs within MBSFN by the content server, wherein the content distribution message having a content identification tag in order to inform all the enodeBs the appropriate time period or the non-busy period to download the content segments and downloading the content segments by all the enodeB's from the content server, wherein all the enodeB's obtains a hash table including all the hash segment of file which needs to be downloaded by a particular enodeBand the lifespan of the downloaded content from the content server.

In another aspect of the present invention is an An enode B, comprising: a memory, a processor coupled to the memory, a clock unit, an Encryptor/decryptor unit either as a separate module or as a thread in processor or as an accelerator module within the processor and a digital signal processing unit coupled to the processor, wherein the processor is configured for dividing the network into multiple MB SFN (Single Frequency Network), wherein each of which includes multiple eNodeBs, wherein the eNodeBs are time synchronized with each other, broadcasting a content distribution message to all the enodeBs within MBSFN by the content server, wherein the content distribution message having a content identification tag in order to inform all the enodeBs the appropriate time period or the non-busy period to download the content segments and downloading the content segments by all the enodeB's from the content server, wherein all the enodeB's uses the hash table obtained from the content server including all the hash segment of file which needs to be downloaded by a particular enodeB and the lifespan till which the downloaded content has to be saved before destruction.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
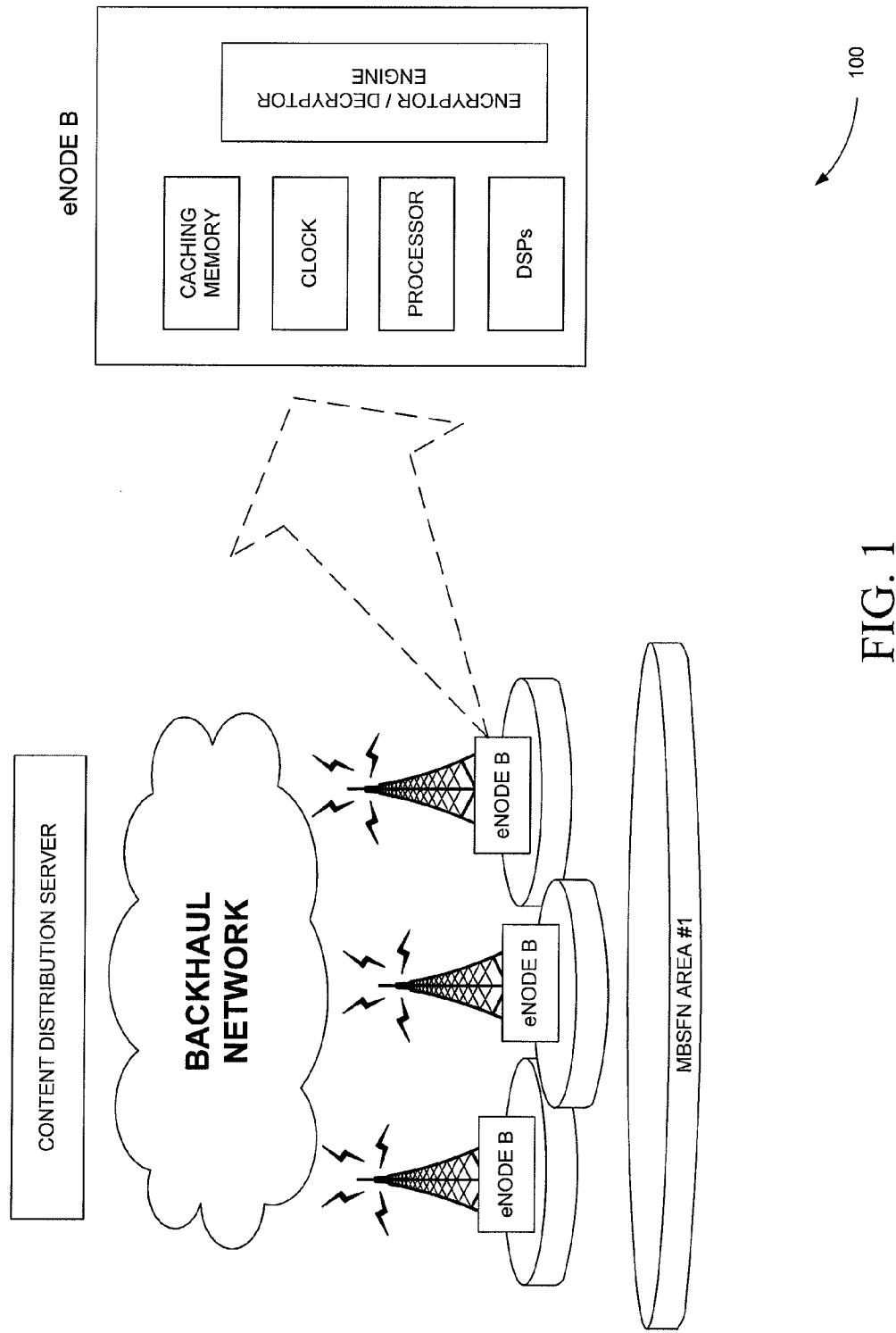
FIG. 1 shows a system of carrying content from a Content Server to a plurality of enodeB's over an LTE network, according to one embodiment of the present invention.
Figure 2:
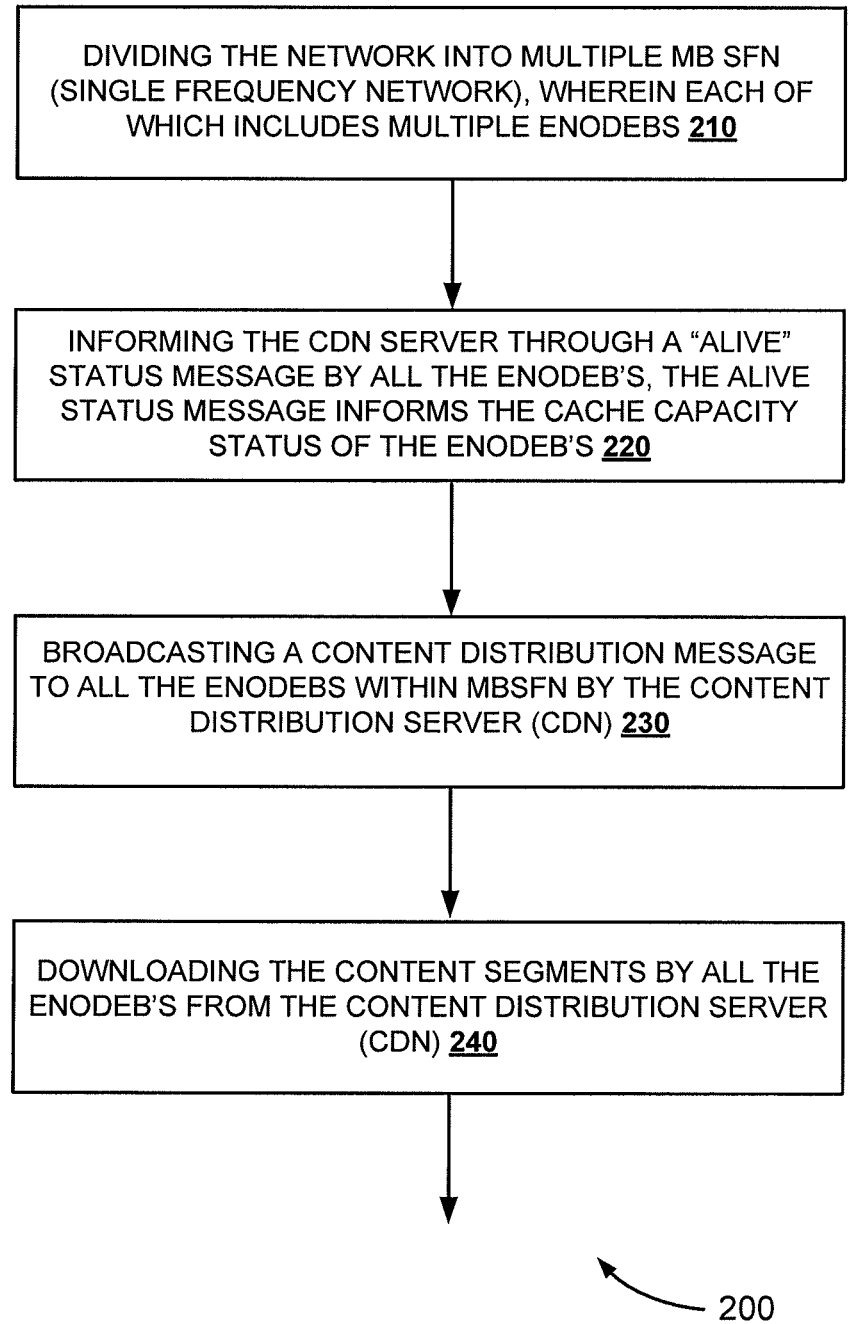
FIG. 2 shows a flow chart of a method of carrying content from a Content Server to a plurality of enodeB's over an LTE network, according to one embodiment of the present invention.
Figure 3:
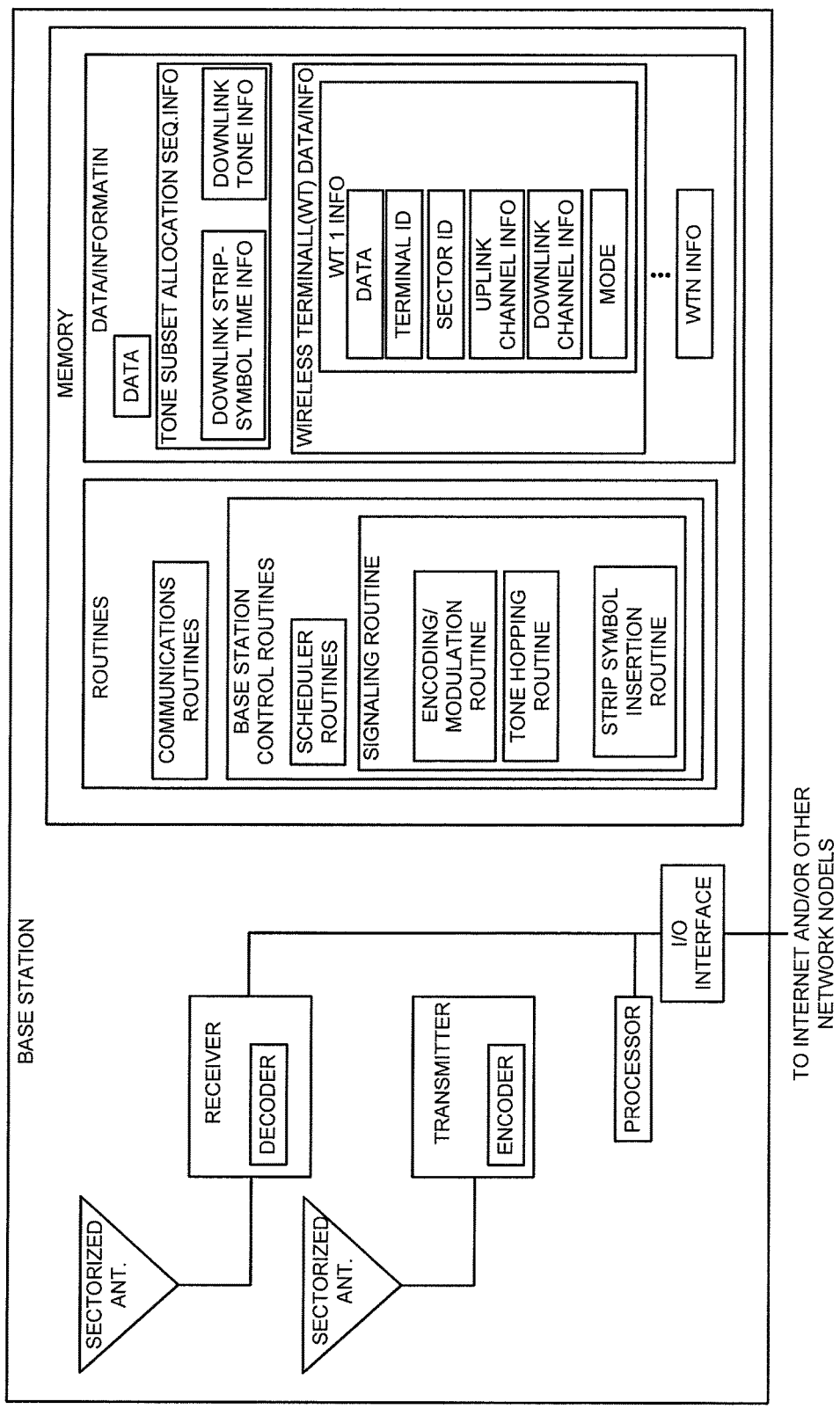
FIG. 3 is an illustration of an example base station in accordance with various aspects.

FIGS. 1 through 3, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an eNodeB, a site controller, an access point (AP), or any other type of interfacing device capable of operating in a wireless environment.

FIG. 1 shows a system of carrying content from a Content Server to a plurality of enodeB's over an LTE network, according to one embodiment of the present invention. The content server may be or may include content distribution server, content hosting server etc. The system includes a backhaul network with a plurality of eNodeBs in a MB SFN area. The enodeB, NodeB or Base Station has the same meanings which are used interchangeably throughout the description of the present invention. The enodeB includes a caching memory, a clock unit, a processor, a digital signal processing unit, and an encryptor/decryptor unit. The encryptor/decryptor unit may be as a separate module or as a thread in processor or as an accelerator module within the processor. The MBMS feature in LTE is a logical entity that controls the eNodeBs and coordinates multi-cell scheduling and transmission when the eNodeBs belong to the same cell group. Functions of MBMS coordination unit may include scheduling and timing control, counting, eNodeB registration and feedback. For each SFN, the MBMS multi-cell coordination unit also configures the common scrambling code of each eNodeB in the SFN. For different MBMS, the SFN may be different (consisting of different cells/eNodeBs).

In an operation, the system divides the network into multiple MB SFN (Single Frequency Network) including multiple eNodeBs, where the eNodeBs are time synchronized with each other. All the enodeBs keep informing the content server through an "ALIVE" status message, where the ALIVE status message informs the cache capacity status of the enodeB's. The content server through the splitting of content segments as mentioned in the hash table will ensure that the content to be cached at a particular enodeB is within the cache capacity of that enodeB based on the most latest ALIVE status messages, and further content server also ensures that there is enough redundancy of segment build in across different enodeB's in a MBSFN. The eNodeBs within an MBSFN are identified by the IP/MAC address and are aggregated within a IP or Layer-2 multicast for the purpose of distribution of content distribution message.

The content server further broadcasts a content distribution message to all the enodeBs within MBSFN. The content distribution message having a content identification tag in order to inform all the enodeBs the appropriate time period or the non-busy period to download the content segments.

All the enodeB's downloads the content segments from the content server based on an encrypted hash table maintained by all the enodeB's which are obtained initially from the content server or a separate hash engine. The hash table includes the hash segment of file are downloaded by a particular enodeB and the lifespan of the downloaded content. The hash file segments which are marked or indicated for particular enodeB are decrypted and the remaining are fetched from other enodeB as per the hash table via X2 interface.

The downloading of the content segment will wake up all the enodB's during the non-busy period and downloads its relevant segments from the content server. The downloaded content at the enodeB cache is an encrypted version of the file along with forward error correction for the segment.

In an example embodiment, the present invention can be used for secure way of carrying movie over a LTE network (MoLTE). This present invention uses the MBMS feature in LTE along with efficient use of traffic buffering during the non-peak hour at the base station to provide an efficient means of using backhaul capacity without affecting peak time traffic for broadcasting movies and live sports events at the same time providing least congestion to the other unicast bearer traffic. The present invention also includes a mechanism to buffer the traffic well before the launch of movie and keep it in an encrypted format to be decrypted only for simultaneous movie launch across all LTE base station on a specific day and time. This system also includes a mechanism to specify a timeout mechanism to remove the content of the server after a specified period of a broadcast as well as to keep some segment of the content in distributed caching model across different enodeBs which are part of a single frequency network (SFN) to be downloaded just before screening to prevent piracy of the content before the launch data of the movie as well as to optimize the usage of cache at each enodeBs in the MBSFN.

The present system put forward to have distributed caching server with an option to download the content at appropriate time, encrypt/decrypt and delete the multicast/broadcast data based on the clock information. Further, the wall clock value in the synchronized clock module also is used to generate the decrypt key which aids the Encryptor/decryptor module in decrypting the content segment. The present system optimizes the cache in different enodeBs to save cost of caching. Further, the system helps in providing higher security on distributed caching, destruction of content after lifespan is over. Also for example, it provides a means to have Friday launch of movie like it happens in multiplex and matches the present pattern of movie launch. Further, the contents are cached during non-peak hour hence reduces the cost of backhaul or improves the performance of non-movie traffic during peak hours.

FIG. 2 shows a flow chart of a method of carrying content from a content server to a plurality of enodeB's over an LTE network, according to one embodiment of the present invention.

At step 210, the method divides the network into multiple MB SFN (Single Frequency Network), where each of which includes multiple eNodeBs, where all the eNodeBs are time synchronized with each other. The method identifies all the enodeBs in the MBSFN network through IP/MAC address and are aggregated within a IP and for layer 2 multicast for the purpose of distribution of content distribution message.

At step 220, the method allows the enodeB's to informing the content server through a "ALIVE" status message. The "ALIVE" status message also informs the cache capacity status of the enodeB's. The content server through the splitting specified in hash table also ensures that the content to be cached at a particular enodeB is within the cache capacity of that enodeB based on the most latest ALIVE status messages, and further content server also ensures that there is enough redundancy of segment build in across different enodeB's in a MBSFN. The enodeB's within a MBSFN network have X2-U connectivity among each other.

At step 230, the method broadcasts "a content distribution message" to all the enodeBs within MBSFN by the content server. The content distribution message includes a content identification tag in order to inform all the enodeBs the appropriate time period or the non-busy period to download the content segments. During this time the hash table are also distributed to all eNodeBs by the content server. The hogging peak time for data transfer is handled in the present invention by using non-peak time to buffer the data.

At step 240, the method downloads the content segments by all the enodeB's from the content server as required by the hash table for a particular eNodeB. Further, the enodeB's maintains a hash table including all the hash segment of file which needs to be downloaded by a particular enodeB and the lifespan of the downloaded content. The hash file segments which are marked or indicated for particular a enodeB are decrypted when the clock unit has the value which is same as the key used by the encryptor and the remaining are fetched from other enodeB as per the hash table via X2 interface, which would also have been simultaneously decrypted by other eNodeBs. The key using which the first content segment was decoded will be used for subsequent decoding of all the other segments.

The downloading of the content segments by all the enodeB's will wake up during the non-busy period and downloads its segments from the content server. Further, the downloaded content at the enodeB cache is an encrypted version of the file along with forward error correction for the segment. Further, the method distributes the encrypted content based on hash table to all the enodeBs by the content server.

FIG. 3 illustrates an example base station 300 in accordance with various aspects. Base station implements tone subset allocation sequences, with different tone subset allocation sequences generated for respective different sector types of the cell. Base station may be used as any one of base stations of the system of FIG. 1. The base station includes a receiver, a transmitter, a processor, e.g., CPU, an input/output interface and memory coupled together by a bus over which various elements may interchange data and information.

Sectorized antenna coupled to receiver is used for receiving data and other signals, e.g., channel reports, from wireless terminals transmissions from each sector within the base station's cell. Sectorized antenna coupled to transmitter is used for transmitting data and other signals, e.g., control signals, pilot signal, beacon signals, etc. to wireless terminals or nodes (see FIG. 1) within each sector of the base station's cell. In various aspects, base station may employ multiple receivers and multiple transmitters, e.g., an individual receiver for each sector and an individual transmitter for each sector. Processor, may be, e.g., a general purpose central processing unit (CPU). Processor controls operation of base station under direction of one or more routines stored in memory and implements the methods. I/O interface provides a connection to other network nodes, coupling the BS to other base stations, access routers, AAA server nodes, etc., other networks, and the Internet. Memory includes routines and data/information.

Data/information includes data, tone subset allocation sequence information including downlink strip-symbol time information and downlink tone information, and wireless terminal (WT) data/info including a plurality of sets of WT information: WT 1 info and WT N info. Each set of WT info, e.g., WT 1 info includes data, terminal ID, sector ID, uplink channel information, downlink channel information, and mode information.

Routines include communications routines and base station control routines. Base station control routines includes a scheduler routine and signaling routines including an encoding/modulation routine, a tone hopping routine, and a strip symbol insertion routine. Scheduler routine controls determining a type of downlink transmission unit to transmit (e.g., type 0, type 1, . . . ). Routines include PDCP, RLC layer, RRM etc. as well in case of LTE.

Data includes data to be transmitted that will be sent to encoder of transmitter for encoding prior to transmission to WTs, and received data from WTs that has been processed through decoder of receiver following reception. Downlink strip-symbol time information includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information includes information including a carrier frequency assigned to the base station, the number and frequency of tones, and the set of tone subsets to be allocated to the strip-symbol periods, and other cell and sector specific values such as slope, slope index and sector type.

Data may include data that WT 1 has received from a peer node, data that WT 1 desires to be transmitted to a peer node, and downlink channel quality report feedback information. Terminal ID is a base station assigned ID that identifies WT 1. Sector ID includes information identifying the sector in which WT 1 is operating. Sector ID can be used, for example, to determine the sector type. Uplink channel information includes information identifying channel segments that have been allocated by scheduler for WT 1 to use, e.g., uplink traffic channel segments for data, dedicated uplink control channels for requests, power control, timing control, etc. Each uplink channel assigned to WT 1 includes one or more logical tones, each logical tone following an uplink hopping sequence. Downlink channel information includes information identifying channel segments that have been allocated by scheduler to carry data and/or information to WT 1, e.g., downlink traffic channel segments for user data. Each downlink channel assigned to WT 1 includes one or more logical tones, each following a downlink hopping sequence. Mode information includes information identifying the state of operation of WT 1, e.g. sleep, hold, on.

Communications routines control the base station to perform various communications operations and implement various communications protocols. Base station control routines are used to control the base station to perform basic base station functional tasks, e.g., signal generation and reception, scheduling, and to implement the steps of the method of some aspects including transmitting signals to wireless terminals using the tone subset allocation sequences during the strip-symbol periods.

Signaling routine controls the operation of receiver with its decoder and transmitter with its encoder. The signaling routine is responsible for controlling the generation of transmitted data and control information. Encoding/modulation routine controls coding and modulation for non-strip symbols and strip symbols. Further, tone hopping routine controls tone hopping in connection with non-strip symbols. Moreover, strip symbol insertion routine controls selectively positioning a strip symbol within a type 1 downlink transmission unit.

Expressions such as "including", "comprising", "incorporating", "consisting of, "have", "is" used to describe and claim the present invention are intended to be construed in a nonexclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

FIGS. 1-3 are merely representational and are not drawn to scale. Certain portions thereof may be exaggerated, while others may be minimized. FIGS. 1-3 illustrate various embodiments of the invention that can be understood and appropriately carried out by those of ordinary skill in the art.

I claim:

1. A method of carrying content from a content server to a plurality of enodeBs over a long term evolution (LTE) network, the method comprising:

dividing the LTE network into multiple MB SFN (Single Frequency Network), wherein each of which includes multiple enodeBs, wherein each of the multiple enodeBs are time synchronized with each other;

broadcasting a content distribution message to each of the multiple enodeBs within a MBSFN by the content server, wherein the content distribution message comprises a content identification tag in order to inform the multiple enodeBs an appropriate time period or a non-busy period to download content segments; and downloading the content segments by at least one of the multiple enodeBs from the content server, wherein the at least one of the multiple enodeBs obtains a hash table including all hash segments of the content segments which needs to be downloaded by the at least one of the multiple enodeBs and a lifespan of the downloaded content segments from the content server.

2. The method of claim 1, wherein downloading the content segments by the at least one of the multiple enodeBs comprises waking up during the non-busy period and downloading the content segments as specified in the hash table from the content server.

3. The method of claim 2, wherein the downloaded content segments is stored at a cache of the at least one of the multiple enodeBs and is an encrypted version of the content segments along with forward error correction for the downloaded content segments.

4. The method of claim 1, wherein the hash segments which are marked or indicated for the at least one of the multiple enodeBs are decrypted by the at least one of the multiple enodeBs and remaining segments are fetched from other of the multiple enodeBs as per the hash table via a X2 interface.

5. The method of claim 1, further comprising:

distributing encrypted content based on the hash table to each of the multiple enodeBs by the content server.

6. The method of claim 1, further comprising:

identifying the multiple enodeBs in the MBSFN network through IP/MAC address and aggregating within an IP and for layer 2 multicast for the purpose of broadcasting of the content distribution message.

7. The method of claim 1, further including:

informing the content server through an "ALIVE" status message by each of the multiple enodeBs, wherein the ALIVE status message informs a cache capacity status of the multiple enodeBs.

8. The method of claim 7, wherein the content server through the hash table ensures that the content segments to be cached at the at least one of the multiple enodeBs is within the cache capacity of the at least one of the multiple enodeBs based on the latest or recent-most ALIVE status messages, and further the content server also ensures that there is enough redundancy of the content segments are built in across different enodeBs in the MBSFN.

9. An enodeB, comprising:

a memory;

a processor coupled to the memory;

a clock unit;

an Encryptor/decryptor unit either as a separate module or as a thread in the processor or as an accelerator module within the processor; and a digital signal processing unit coupled to the processor, wherein the processor is configured for:

dividing a network into multiple MB SFN (Single Frequency Network), wherein each of which includes multiple enodeBs, wherein the multiple enodeBs are time synchronized with each other;

broadcasting a content distribution message to the multiple enodeBs within the MBSFN by a content server, wherein the content distribution message having a content identification tag in order to inform the multiple enodeBs an appropriate time period or a non-busy period to download content segments; and downloading the content segments by the enodeB from the content server, wherein the enodeB uses a hash table obtained from the content server, the hash table including hash segment of the content segments which needs to be downloaded by the enodeB and a lifespan till which the downloaded content segments has to be saved before destruction.

10. The enodeB of claim 9, wherein the clock unit is configured to synchronize the multiple enodeBs within the MBSFN, keep the content identification tag and lifespan information in a database, and trigger the processor for content purging as the lifespan of the downloaded content segments expires.

11. The enodeB of claim 9, wherein the encryptor/decryptor unit works based on a standard asymmetric encryption protocol including a private key and a public key, wherein the private key is obtained when a clock value is equal to a time for premiering the content segments.

12. The enodeB of claim 9, wherein the multiple enodeBs within a MBSFN network have X2-U connectivity among each other.

* * * * *